United States Patent
Nomerange

(10) Patent No.: US 6,922,006 B2
(45) Date of Patent: Jul. 26, 2005

(54) GEARED MOTOR FOR A WINDOW REGULATOR AND METHOD FOR OPERATING THE WINDOW REGULATOR

(75) Inventor: Herve Nomerange, Caen (FR)

(73) Assignee: ArvinMeritor Light Vehicle Systems - France, Sully-sur-Loire (FR)

( * ) Notice: Subject to any disclaimer, the term of this patent is extended or adjusted under 35 U.S.C. 154(b) by 0 days.

(21) Appl. No.: 10/492,383
(22) PCT Filed: Oct. 11, 2002
(86) PCT No.: PCT/FR02/03483
§ 371 (c)(1), (2), (4) Date: Sep. 3, 2004
(87) PCT Pub. No.: WO03/032471
PCT Pub. Date: Apr. 17, 2003

(65) Prior Publication Data
US 2005/0017600 A1 Jan. 27, 2005

(30) Foreign Application Priority Data
Oct. 12, 2001 (FR) .............................. 01 13198

(51) Int. Cl.⁷ ........................... H01L 41/08; H02N 2/00
(52) U.S. Cl. .................... 310/328; 310/93; 310/90
(58) Field of Search ................................ 310/328, 311, 310/77, 93, 90; H02N 2/00; H01L 41/08

(56) References Cited

U.S. PATENT DOCUMENTS 6,069,420 A * 5/2000 Mizzi et al. ................. 310/328
6,308,461 B1 * 10/2001 Hopson et al. ............. 318/280
6,448,729 B1 * 9/2002 Davies et al. ............... 318/434

FOREIGN PATENT DOCUMENTS

DE 3110368 10/1982
GB 1592748 7/1981

* cited by examiner

Primary Examiner—Tom Dougherty
Assistant Examiner—Karen B. Addison
(74) Attorney, Agent, or Firm—Carlson, Gaskey & Olds

(57) ABSTRACT

A window regulator includes an electric motor having a drive shaft, a window slider, a transmission having an input driven by a drive shaft and an output driving the slider. A geared motor includes a drive shaft, a reduction gear coupled to the drive shaft and having a transmission ratio less than 1, and a piezoelectric element selectively locking the drive shaft. The window regulator can be used to prevent fraudulent opening of a window and to reduce the jamming force of an object between the window and the window frame.

20 Claims, 2 Drawing Sheets

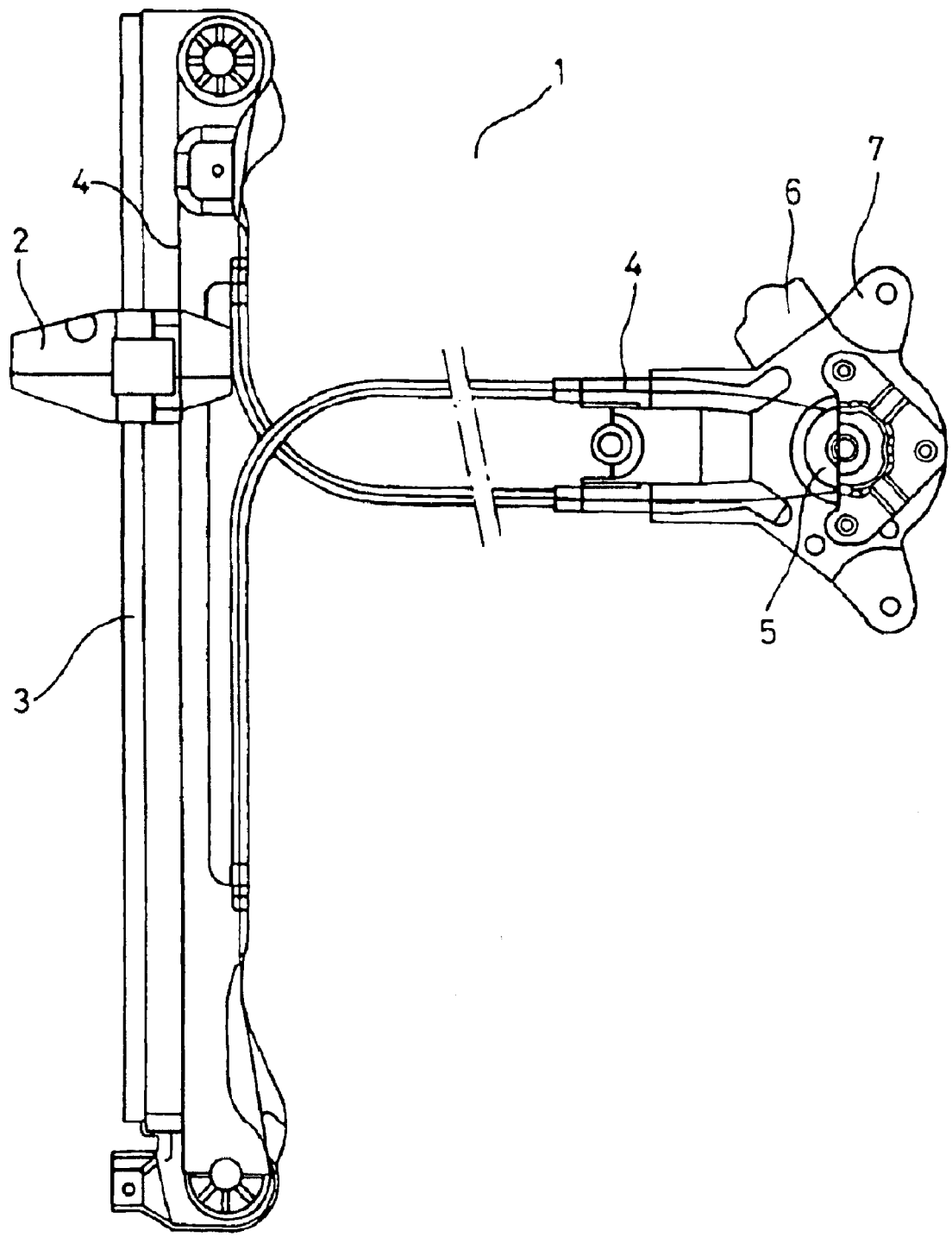
FIG_1

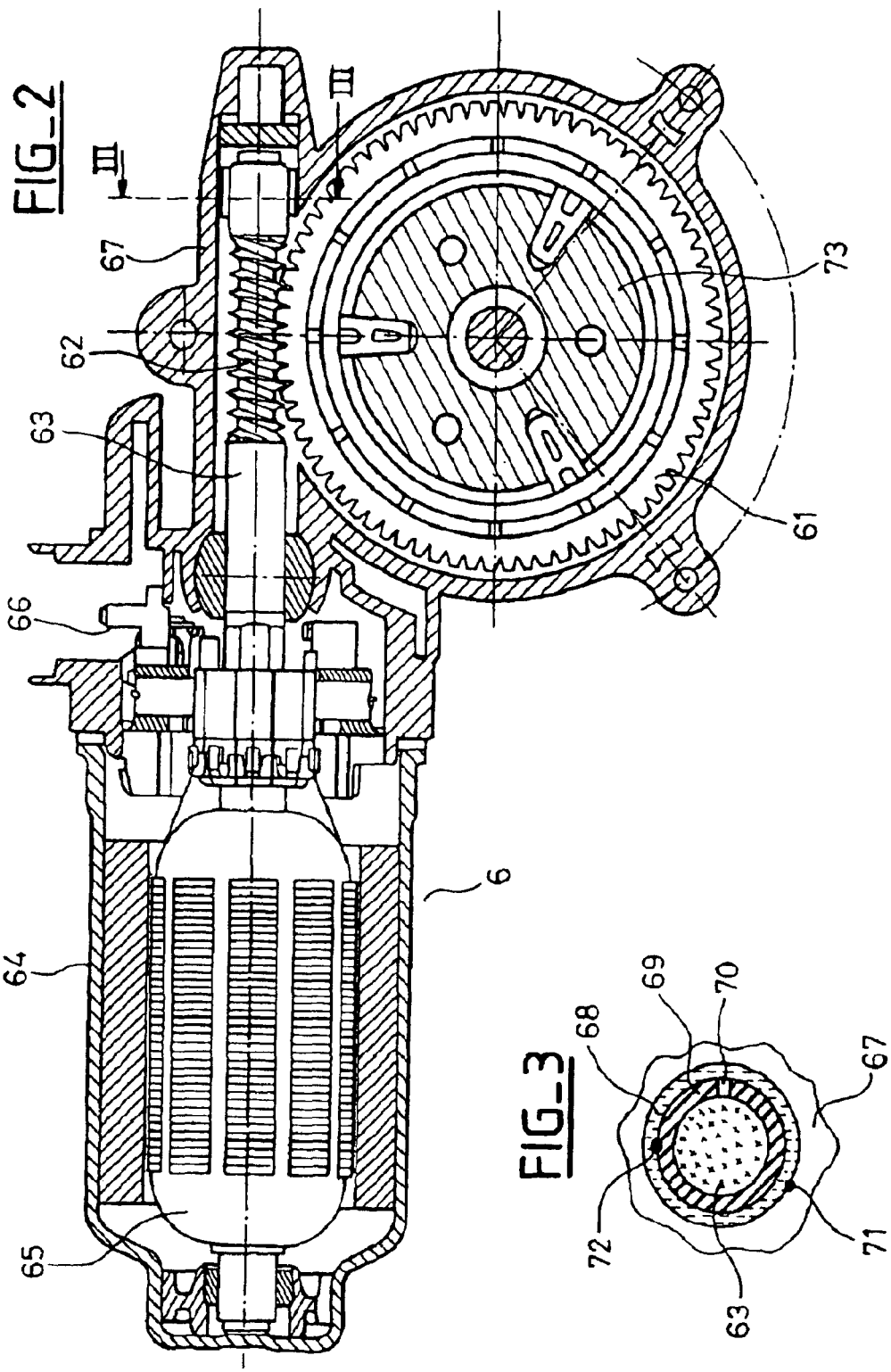

GEARED MOTOR FOR A WINDOW REGULATOR AND METHOD FOR OPERATING THE WINDOW REGULATOR

REFERENCE TO RELATED APPLICATIONS

This applications claims priority to PCT Applications PCTFR02/03483 filed on Oct. 11, 2002, which claims priority to French Patent Application FR 01 13 198 filed on Oct. 12, 2001.

BACKGROUND OF THE INVENTION

Technical Field

The invention relates generally to geared motors for window regulators in vehicles and more particulary to window regulators with a window braking and irreversibility device.

Known window regulators have a system for driving a vehicle window up and down. A person may try to open the vehicle window by applying downward pressure to the vehicle window when the window is closed or partially open to illegally gain access to the passenger compartment of the vehicle.

One known window regulator, includes an electric motor with a reduction gear and an output shaft having teeth at one end and forming a worm. The worm engages a wheel to form a wheel and worm reduction gear, and the wheel transmits movement to a cable driving drum. A cable wound around the drum drives a slider attached to the vehicle window upwardly and downwardly. In this window regulator, the wheel and worm reduction gear have a transmission efficiency of approximately 40 percent. When pressure is applied to the vehicle window, the motor and the low efficiency transmission prevent rotation of the wheel, and the irreversible driving up and down of the vehicle window by the drum is thus assured.

However, this device has disadvantages. Because of the low transmission efficiency, the motor that drives the drum is oversized relative to the drive force actually applied to the drum, and therefore the motor is bulky and costly.

German Patent Application DE-A-3110368 discloses a window regulator including a drive component coupled to a drum. The drum drives a window upwardly and downwardly by a cable attached to a window slider. The drum is equipped with a mechanical locking device. A gear placed on an axis of a drive shaft is equipped with axially projecting lugs. The axially projecting lugs lock against a fixed plate arranged in the structure of the window regulator. The window regulator is released when the drive shaft drives the drums and the window regulator is locked when the drum drives the drive shaft.

There are several drawbacks to this device. For one, the device is complex and costly, and the drum is bulky. The device also requires an additional braking system to stop the window from rising when an obstruction is detected.

Known devices may also include an anti-pinch system that measures the current consumed by the motor and the rotating speed of the motor. The anti-pinch system detects the pinching of an object between the top of the window and the window frame from variations in these parameters. The power supply to the motor is then stopped, and the driving of the window is stopped.

The anti-pinch system has disadvantages. The response time between the pinching of an object and the actual stopping of the movement of the window is significant. The window is still being driven during this response time, and a user may possibly be injured. It is also more difficult to obtain approval for vehicles using this type of window regulator.

There is therefore a need for a window regulator and a geared motor that provides a solution to one or more of these disadvantages.

SUMMARY OF THE INVENTION

The present invention provides a window regulator including a geared motor having a drive shaft, a window slider, a transmission having an input driven by the drive shaft and an output driving the slider. A piezoelectric element selectively locks the position of the slider.

In one embodiment, the piezoelectric element acts upon the drive shaft. In another embodiment, the piezoelectric element has a friction surface that is able to lock the position of the slider. In a further embodiment, the friction surface has a coefficient of friction on the drive shaft greater than 0.15. In yet another embodiment, the transmission has a reduction gear with a speed reduction ratio between the input and the output of the geared motor of less than 1.

The reduction gear can include a worm wheel system, and a worm is provided on the drive shaft. In one embodiment, the piezoelectric element forms a journal of the drive shaft. In another embodiment, the piezoelectric element locks the drive shaft by a split bearing.

In a further embodiment, the motor includes a housing with a journal, and the piezoelectric element has an outer surface permanently housed in the journal and an inner surface acting upon the split bearing. In yet another embodiment, the piezoelectric element is piezostrictive. The piezoelectric element can also selectively brake the movement of the slider.

The present invention also provides a geared motor including a drive shaft, a reduction gear coupled to the drive shaft with a speed reduction ratio between the input and the output greater than 1, and a piezoelectric element that selectively locks the drive shaft.

In one embodiment, the piezoelectric element has a friction surface which is able to lock the drive shaft, and the friction surface preferably has coefficient of friction with the drive shaft greater than 0.15. In another embodiment, the reduction gear has a worm wheel system, and a worm is provided on the drive shaft. In a further embodiment, the piezoelectric element forms a journal of the drive shaft. In yet another embodiment, the piezoelectric element locks the drive shaft by a split bearing.

The geared motor can include a housing with a journal, and the piezoelectric element has an outer surface permanently housed in the journal and an inner surface acting upon the split bearing. In one embodiment, the piezoelectric element is piezostrictive. In another embodiment, the piezoelectric element selectively brakes the drive shaft.

The present invention also provides a method for operating a window regulator including the steps of locking a position of the slider position by using the piezoelectric element when the motor is switched off and unlocking the position of the slider position when the motor is supplied with power.

In one embodiment, the piezoelectric element has two terminals, is piezostrictive, and is not supplied with power during the step of locking the slider. In another embodiment, the method includes the steps of the driving of the slider by the motor, detecting an obstruction, and braking the movement of the slider by the piezoelectric element. In a further embodiment, the method also includes a step of short-circuiting the power supply to the motor after detecting an obstruction.

Other characteristics and advantages of the invention are given in the following description of embodiments of the invention, given by way of example and with reference to the appended drawings.

BRIEF DESCRIPTION OF THE DRAWINGS

FIG. 1 schematically illustrates a window regulator including a geared motor according to the invention;

FIG. 2 schematically illustrates a longitudinal cross-section view of the geared motor of the invention; and FIG. 3 schematically illustrates a transverse cross-section view of details of FIG. 2.

DETAILED DESCRIPTION OF PREFERRED EMBODIMENTS

The invention provides a window regulator and a geared motor that drives a window slider. A piezoelectric element locks the position of the slider when the motor is switched off. Thus, the window stays locked in this position if an attempt is made to open the window by an outside force.

FIG. 1 shows a schematic view of a window regulator 1 according to an embodiment of the invention. The window regulator 1 includes a slider 2 attached to a window (not shown). The slider 2 is slidable on a guide rail 3. A cable 4 driven by a drum 5 drives the slider 2. The drum 5 is coupled to a wheel 61 (shown in FIG. 2) of a geared motor 6 by a damper 73 (shown in FIG. 2). The geared motor 6 is fixed to a structural part 7 of the window regulator 1.

As shown in more detail in FIG. 2, the geared motor 6 is housed in a housing 67. The geared motor 6 includes a motor 64 having a rotor 65, a power supply, and a control device 66 that can be produced as known. The wheel 61 is driven by a worm gear 62 on a drive shaft 63 of the motor 64. The wheel 61 is the output element of a wheel and a worm reduction gear. The reduction gear ensures the transmission of mechanical power between the drive shaft 63 and the drum 5. The reduction gear also has a speed reduction ratio between the input and the output of the geared motor 6 greater than one. The input speed of the reduction gear is thus greater than the output speed of the reduction gear. Although a wheel and worm reduction gear is described, it is possible to use any type of reduction gear. The damper 73 connects the drum 5 and the wheel 61 and absorbs the shocks during the transient drive phases of the motor 64. The drum 5 serves as winding component for the cable 4 that drives the slider 2.

The geared motor 6 includes a piezoelectric element 68 that selectively locks the position of the slider 2, allowing a small size-locking part with a simple shape to be used. The piezoelement 68 is also easy to produce. The locking of the slider 2 can be selectively controlled using a simple device with the piezoelectric element 68. The piezoelectric element 68 can lock the position of the slider 2 by braking. If the position of the slider 2 is locked to a force of, for example, 500 N applied to the window, it is locked. The position of the slider 2 is selectively locked to ensure the irreversibility of the window regulator 1. Therefore the slider 2 cannot be driven by the windows, but the slider 2 can be driven by the motor 64. The selective locking of the slider 2 will be detailed later. Generally, the slider 2 position is locked when the motor 64 is switched off, and the slider 2 position is unlocked when the motor 64 is supplied with power. The irreversibility is selective, and it is possible to use a reduction gear with high transmission efficiency. A less powerful motor 64, such as a 20 watt motor, can then be used.

In FIG. 2, the position of the slider 2 is locked by locking the drive shaft 63 by the piezoelectric element 68. As further shown FIG. 3, the piezoelectric element 68 can be used as a journal of the motor 64, and the geared motor 6 can thus be kept small. Moreover, the volume of the drum 5 is not increased. The piezoelectric element 68 can be substantially cylindrical. The piezoelectric element 68 can be placed in a recess in the housing 67 or be mounted with a tight fit in a hole in the housing 67. Preferably, the piezoelectric element 68 is arranged in the housing 67 of the geared motor 6. Generally, an outer surface of the piezoelectric element 68 can be permanently housed in a hole in the housing 67. The electrical connections of the piezoelectric element 68 can be located in the same location as the motor 64 power supply electrical connections, and the electrical wiring of the window regulator 1 can therefore be simplified.

The piezoelectric element 68 can lock the drive shaft 63 via a shaft rotation guide component. As shown in FIG. 3, a split bearing 69 can be used for this. In this embodiment, the split bearing 69 is housed against an inner surface of the piezoelectric element 68. The split bearing 69 has a substantially longitudinal split 70, and the diameter of the split bearing 69 can therefore vary. By placing a radial load on the split bearing 69, the width of the split 70 and the diameter of the split bearing 69 can be reduced, and the brake force applied by the split bearing 69 on the drive shaft 63 is increased. When the piezoelectric element 68 is in a dilated position, i.e. when its inner diameter reaches a minimum size, the inner surface of the piezoelectric element 68 acts upon the split bearing 69 and reduces the width of the split 70. The rotation of the drive shaft 63 is then locked by the split bearing 69.

The piezoelectric element 68 can be made of quartz or barium titanate. Preferably, the piezoelectric element 68 is made of a piezostrictive material. Thus, the piezoelectric element 68 is in a dilated position or locking position when idle. When the power supply to the piezoelectric element 68 is interrupted, such as due to a dead battery, the piezoelectric element 68 still continues to lock the slider 2 position. In one example, a 10 mm×8 mm×5 mm piezoelectric element 68 can be used with a reduction gear with a speed reduction ratio of 73 to ensure a locking force of 500 N on the slider 2. An unlocking voltage of 12 V to 60 V between the electrodes releases the drive shaft 63, in this example.

An electrode (not shown) is preferably arranged on both the outer circumference and the inner circumference of the piezoelectric element 68, ensuring a greater variation of the inner diameter of the piezoelectric element 68.

In one example, the split bearing 69 is made of sintered and lubricated bronze. In one example, the split bearing 69 has an inner diameter of 8 mm, a minimum thickness of 5 mm and a minimum outer diameter of 10 mm to ensure the drive shaft 63 is locked.

The piezoelectric element 68 can act directly upon the drive shaft 63. Preferably, the piezoelectric element 68 has a friction surface with a high coefficient of friction with the drive shaft 63. A coating with a high coefficient of friction with the drive shaft 63 can also be used. The coating can be applied to the surface of the piezoelectric element 68 contacting the drive shaft 63. Preferably, the friction surface has a coefficient of friction greater than 0.15.

The arrangement of the piezoelectric element 68 upstream of the reduction gear, and in particular on the drive shaft 68, provides several advantages. The piezoelectric element 68 can have reduced braking power because the reduction gear multiplies the braking torque applied by the piezoelectric element 68 on the slider 2.

The piezoelectric element 68 can also selectively brake the movement of the slider 2. The arrangement of the piezoelectric element 68 on the drive shaft 63 is also advantageous for carrying out the braking. It is possible to brake the movement of the slider 2 when an obstruction is detected in the window. By using the piezoelectric element 68 for braking, the inertia of the motor 64 can be reduced more quickly, reducing the response time between identifying an obstruction and stopping the slider 2 and the window. Moreover, a piezoelectric element 68 that already exists to ensure irreversible movement of the slider 2 can be used for the selective braking.

The piezoelectric element 68 and the motor power supply can share a control. The control can apply different voltages to the terminals of the piezoelectric element 68 depending on the operation to be carried out. Different braking or unlocking voltages can be used depending on detected external conditions, such as the temperature, the power supply status of the motor, or the pinching of an object.

The invention also relates to a method for operating the window regulator 1 and the geared motor 6 described above.

The position of the slider 2 is locked by the piezoelectric element 68 when the motor 64 is switched off. The piezoelectric element 68 can be kept idle during this step, such as when a piezostrictive piezoelectric element 68 is used. The position of the slider 2 is unlocked by exciting the piezostrictive piezoelectric element 68 when the motor 64 is supplied with power.

According to a second method for operating the window regulator 1, the slider 2 is driven by the motor 64. When an obstruction is detected in the window , a braking instruction is sent to the piezoelectric element 68. The piezoelectric element 68 then brakes the slider 2.

According to one embodiment, the power supply to the motor 64 is short-circuited after an obstruction is detected. Additional braking is then provided by a motor brake.

Of course, this invention is not limited to the examples and embodiments described and shown, but is open to a number of embodiments accessible to a person skilled in the art. Although the locking of the position of the slider 2 on the drive shaft 13 has mainly been described, the locking can occur in any suitable place. For example, a piezoelectric locking element 68 placed on a slider 2 and acting on a guide rail can be installed. A piezoelectric element 68 on the reduction gear wheel acting upon the housing 67 of a geared motor 6 can also be employed.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A window regulator comprising:
an electric motor having a drive shaft;
a window slider;
a transmission having an input driven by the drive shaft and an output driving the window slider;
a split bearing; and
a piezoelectric element that selectively locks a position of the window slider by locking the drive shaft using the split bearing, and the split bearing is adjacent the piezoelectric element.

2. The window regulator according to claim 1, wherein the piezoelectric element has a friction surface to lock the position of the window slider.

3. The window regulator according to claim 2, wherein the friction surface has a coefficient of friction on the drive shaft greater than 0.15.

4. The window regulator according to claim 2, wherein the transmission has a reduction gear with a speed reduction ratio between a gear input and a gear output of the reduction gear greater than 1.

5. The window regulator according to claim 4, wherein the reduction gear comprises a worm wheel system, and a worm is provided on the drive shaft.

6. The window regulator according to claim 1, wherein the piezoelectric element forms a journal of the drive shaft.

7. The window regulator according to claim 1, wherein:
the electric motor has a housing with a journal; and
the piezoelectric element has an outer surface permanently housed in the journal and an inner surface acting upon the split bearing.

8. The window regulator according to claim 1, wherein the piezoelectric element is piezostrictive.

9. The window regulator according to claim 1, wherein the piezoelectric element selectively brakes movement of the window slider.

10. A geared motor comprising:
a drive shaft;
a reduction gear coupled to the drive shaft and having a transmission ratio lower than 1;
a split bearing; and
a piezoelectric element that selectively locks the drive shaft using the split bearing, and the split bearing is adjacent the piezoelectric element.

11. The geared motor according to claim 10, wherein the piezoelectric element has a friction surface to lock the drive shaft, the friction surface having a coefficient of friction with the drive shaft greater than 0.15.

12. The geared motor according to claim 10, wherein the reduction gear has a worm wheel system, and a worm is provided on the drive shaft.

13. The geared motor according to claim 10, wherein the piezoelectric element forms a journal of the drive shaft.

14. The geared motor according to claim 10, further comprising a housing with a journal, wherein the piezoelectric element has an outer surface permanently housed in the journal and an inner surface acting on the split bearing.

15. The geared motor according to claim 10, wherein the piezoelectric element is piezostrictive.

16. The geared motor according to claim 10, wherein the piezoelectric element selectively brakes the drive shaft.

17. A method for operating a window regulator comprising the steps of:
providing an electric motor having a drive shaft, a window slider, a transmission having an input driven by the drive shaft and an output driving the window slider, and a piezoelectric element that selectively locks a position of the window slider by locking the drive shaft using a split bearing;
locking the position of the window slider by the piezoelectric element when the electric motor is switched off; and
unlocking the position of the window slider when the electric motor is supplied with power.

18. The method according to claim 17, wherein the piezoelectric element has two terminals and is piezostrictive, and wherein the piezoelectric element is not supplied with power during the step of locking the position of the window slider.

19. A method for operating a window regulator comprising the steps of:

providing an electric motor having a drive shaft, a window slider, a transmission having an input driven by the drive shaft and an output driving the window slider, and a piezoelectric element that selectively locks a position of the window slider by locking the drive shaft using a split bearing;

driving the window slider by the electric motor;

detecting an obstruction; and braking movement of the window slider by the piezoelectric element.

20. The method according to claim 19, further comprising a step of short-circuiting a power supply to the electric motor after the step of detecting the obstruction.

* * * * *